United States Patent [19]

Lawlor et al.

[11] 3,777,412
[45] Dec. 11, 1973

[54] EDUCATIONAL DEVICE
[75] Inventors: John E. Lawlor, Tappan, N.Y.; John Sgombick, Ramsey, N.J.
[73] Assignee: Xerox Corporation, Stamford, Conn.
[22] Filed: Nov. 22, 1972
[21] Appl. No.: 308,866

[52] U.S. Cl. .............................. 35/19 R, 273/120 R
[51] Int. Cl. ......................................... G09b 23/10
[58] Field of Search ................ 35/19 R; 273/120 R, 273/120 A

[56] References Cited
UNITED STATES PATENTS
1,644,514  10/1927  Dietrichs......................... 273/120 R OTHER PUBLICATIONS
Welch Scientific Co., Catalog Rec'd Oct. 1965, page 68 only, "Collision in 2-D."

Primary Examiner—Harland S. Skogquist
Attorney—James J. Ralabate et al.

[57] ABSTRACT

A simple, durable, inexpensive educational device for demonstrating the physical properties of falling objects and collisions especially adapted for use by educational institutions below the college level is described. The device comprises a flexible ruler including channel means for guiding movement of a spherical object and an elongated support member. A vertical support means is releasably secured to the support member and supports the ruler at one end portion thereof in an elevated position. A holding means holds the ruler at the opposite end portion thereof. The device further includes a support means for supporting a spherical object and a sleeve means for containing the support means in slidable relationship thereto.

7 Claims, 3 Drawing Figures

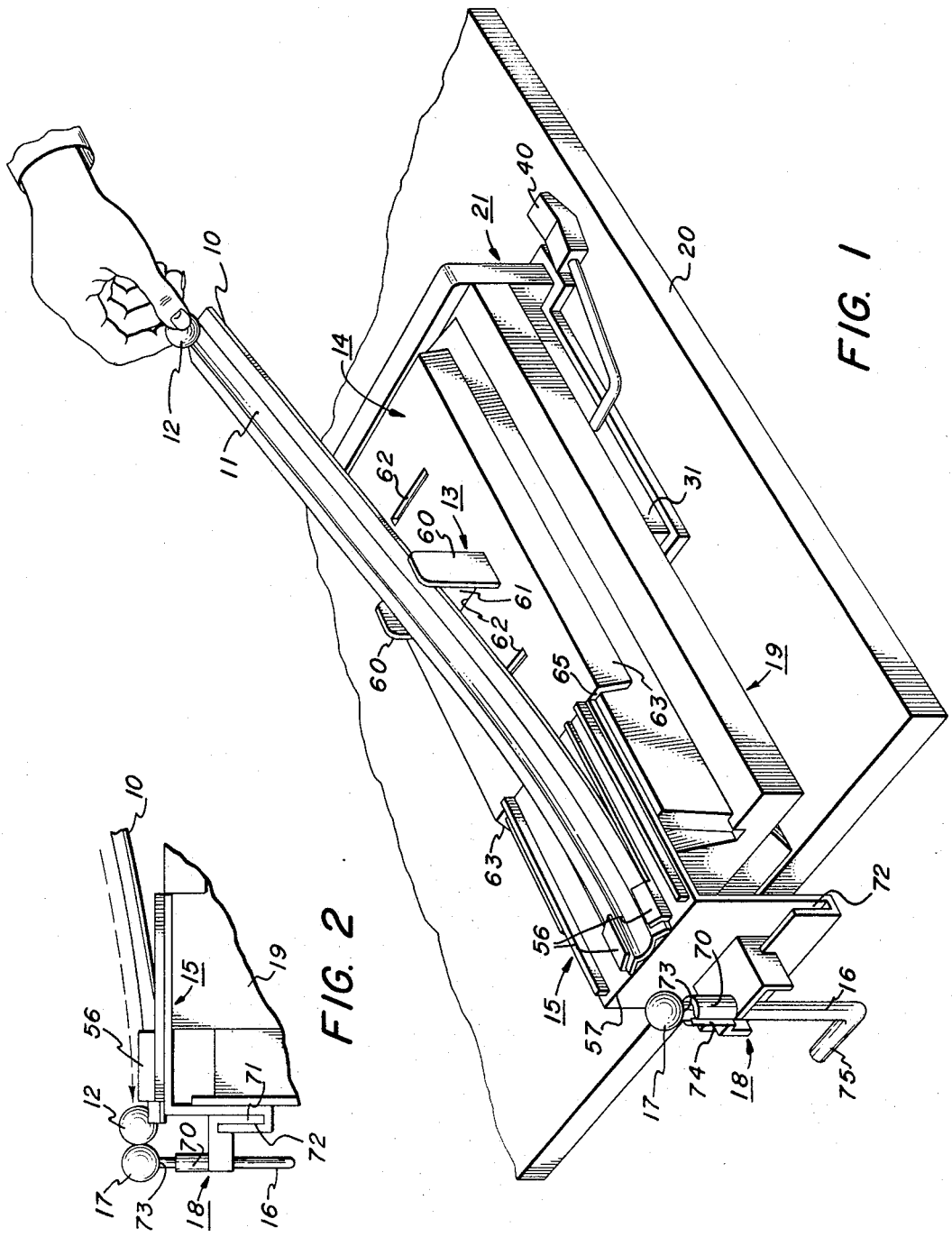

EDUCATIONAL DEVICE

BACKGROUND OF THE DISCLOSURE

1. Field of the Invention

This invention relates to educational devices, and more particularly to an educational device for demonstrating the physical properties of falling objects and collisions, referred to as a collision device.

2. Description of the Prior Art

As an educational device, the collision device is a fundamental tool for the teaching of many principles in learning institutions below the college level. For example, a student is given an opportunity to perform independently the complete sequence of behaviors involved in experimenting: constructing a hypothesis based on observations, designing a test of the hypothesis, interpreting data from the test, describing how the data support or do not support the hypothesis and, if necessary, revising the hypothesis and testing it again. Numerous efforts have been made to construct simple, relatively inexpensive, rugged, easily assembled and relatively portable educational devices of the type described. Examples of some efforts in this area are typified by U.S. Pat. Nos. 874,110, 1,826,180, 1,636,234, 2,913,834, 3,002,294, 3,354,559, 3,599,347 and 3,650,049. The devices described therein, although satisfactory in some respects, do not possess the combined advantages of being relatively inexpensive, rugged, easily assembled and relatively portable when compared to the novel and advantageous device of the present invention.

SUMMARY OF THE INVENTION

It is therefore an object of the present invention to overcome the disadvantages stated hereinabove and to provide an educational device which is simpler, more durable, less expensive, more easily assembled and still more pleasing from a design viewpoint, than prior art devices and otherwise more suitable for use in learning institutions below the college level.

It is a further object of the present invention to provide an educational device for demonstrating the physical properties of falling objects and collisions.

It is a further object of this invention to provide an educational device which is compact when assembled.

It is a further object of this invention to provide an educational device which is quickly disassembled for easy storage in a very small space.

It is a further object of this invention to provide an educational device which does not require a single grommet, screw, bolt, rivet or similar fastening type connection.

It is still a further object of this invention to provide an educational device which, in addition to its educational features and many mechanical advantages, possesses a pleasing design.

The foregoing objects and others are accomplished in accordance with the present invention by providing an educational device comprising a flexible ruler including guide means extending along one surface thereof for constraining movement of a substantially spherical object in the guide means, a support member, a vertical support means releasably secured to the support member for supporting the ruler at one end portion thereof in an elevated position, a holding means for holding said ruler at the opposite end portion thereof in a lower elevation, a support means for supporting a substantially spherical object, and a sleeve means for containing said support means in slidable relationship thereto.

BRIEF DESCRIPTION OF THE DRAWINGS

For a better understanding of the invention as well as other objects and further features thereof, reference is made to the following detailed disclosure of this invention taken in conjunction with the accompanying drawings wherein:

FIG. 1 is a perspective view of an educational device in accordance with the invention affixed to a supporting surface;

FIG. 2 is a partial side view of part of the educational device in accordance with the invention illustrating the collision of two marbles.

DESCRIPTION OF THE PREFERRED EMBODIMENTS

Figure 3:
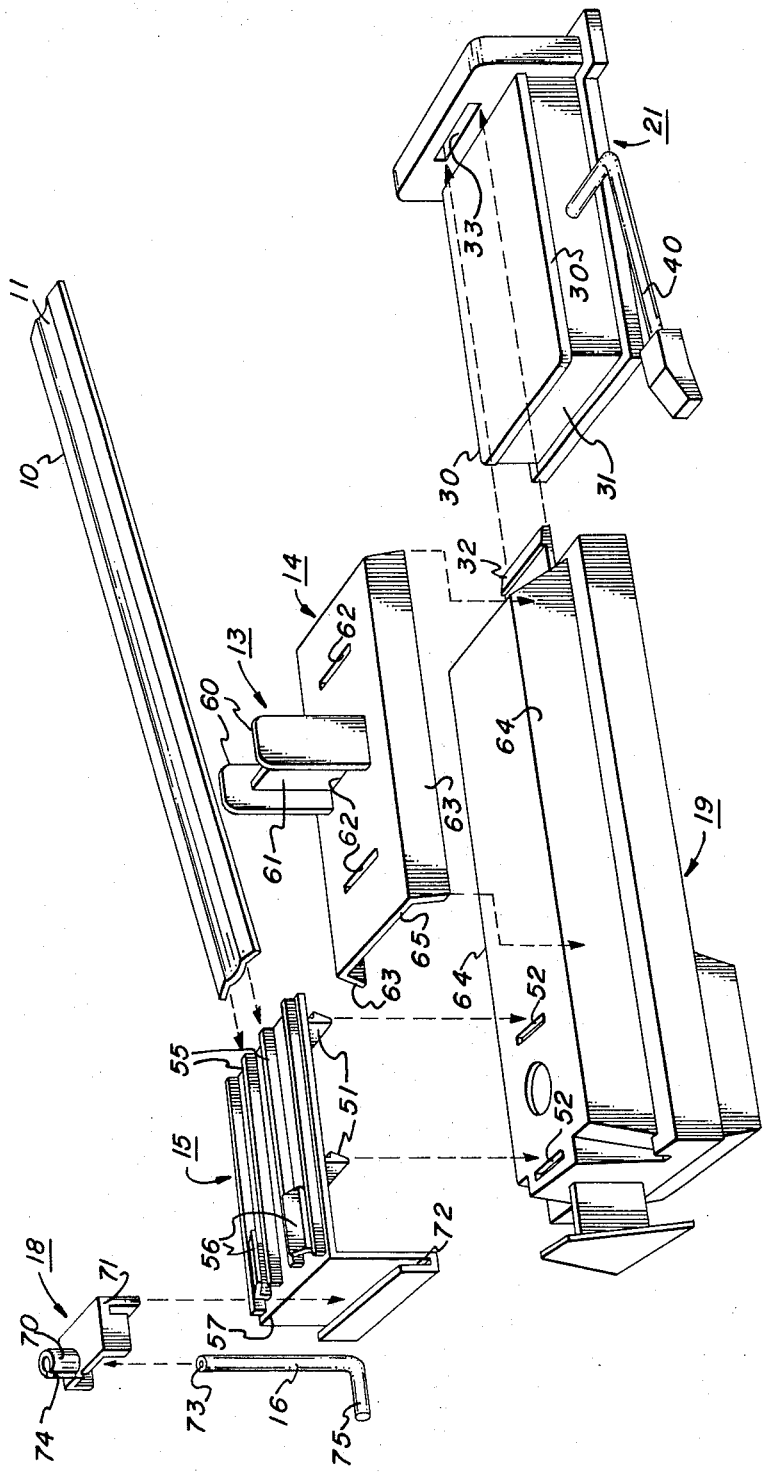
FIG. 3 is a perspective view of individual parts of an educational device in accordance with the invention illustrating how the parts are assembled.

Referring now to FIG 1, the educational device in accordance with the features of this invention is shown to comprise a flexible ruler 10 which includes channel means 11 extending lengthwise along the upper surface of the ruler. The channel means 11 specifically serves the purpose of guiding the movement of a substantially spherical object 12 when the spherical object is placed therein. The flexible ruler 10 which is preferably formed of plastic is supported in an elevated position at one end thereof by a vertical support means 13 which is releasably secured to an elongated support member 14. The opposite end portion of ruler 10 is held at a lower elevation by holding means 15. Releasably secured to holding means 15 is a support means 16 for supporting a substantially spherical object 17 and a sleeve means 18 which contains support means 16 in a slidable relationship thereto.

The educational device described herein is designed to be attached to a base member 19. The educational device including base member 19 can be mounted to a support surface 20, such as a table, by any of numerous securing or mounting means such as, for example, clamps, etc. One specific example of means for mounting the base member 19 to supporting surface 20 is shown as vacuum mounting means 21. By employing such mounting or securing means the device is thereby made portable and demountable for movement from location to location as the need arises. When employing the vacuum mounting means channels (not shown) which are formed in the base member 19 engage extending shoulders 30 (not FIG. 3) of an upper surface of a housing 31 of the vacuum mounting means 21. A tab segment 32 of the base member 19 extends through a window 33 in the vacuum mounting means 21 and engages the window frame for locking the educational device to the vacuum mount. The educational device can be demounted by depressing the tab 32 and simultaneously withdrawing the base 19 from the vacuum mount 21. The educational device including base member 19 is therefore conveniently demountable from the surface 20 by rotation of a lever arm 40 which operates to release the vacuum. A vacuum mount of this type is shown and described in detail and is claimed in corresponding U.S. Pat. application Ser. No. 144,934 filed May 19, 1971 and which is assigned to the assignee of this invention.

In assembling the educational device the vacuum mount 21 is positioned near the edge of a support surface 20, secured thereto, and the base member 19 is connected to the vacuum mount in a locked relationship in the manner described above. As shown in FIG. 3, the holding means 15 can then be snapped into position on the base member 19 by inserting the arrow-shaped tabs 51 into the slots 52 located on the upper surface of the base member. One end of the ruler 10, preferably the end showing the measuring features at zero, is placed on the parallel rails 55 of holding means 15 and then the ruler is then forced under the two arm-like members 56 which project from holding means 15. The ruler 10 is thereby securely held in position at a lower elevation between arm-like member 56 and parallel rails 55. Parallel rails 55 are spaced from each other at a distance which is sufficient to permit insertion of the bottom portion of the channel means 11 therebetween. The ruler 10 is moved forward until it is flush with the edge 57 of the holding means 15 as clearly shown in FIG. 1. Vertical support means 13 which compresses a pair of upright planar surfaces 60 connected to tab 61 is secured to elongated support member 14 by snapping the bottom portion of tab 61 into any of the slots 62 on the elongated support member. The elongated support member is then positioned on the base member 19 by placing leg members 63 on surface 64 of the base member. The free end portion of the ruler 10 is elevated and the elongated support member 14 is moved forward until edge portion 65 thereof is in contiguous relation with holding means 15 as shown in FIG. 1. The free end portion of ruler 10 is then placed on the top portion of tab 61 to form an inclined ramp.

Sleeve means 18 which includes sleeve 70 and edge portion 71 is secured to holding means 15 by inserting edge portion 71 into channel member 72. Tubular support means 16 for supporting a spherical object at its tip portion 73 is then inserted through sleeve 70 into position. Support means 16 includes a handle portion 75 which allows one to easily adjust the height of spherical object 17 when resting on the support means. Sleeve 70 includes an opening 74 which allows the sleeve to expand and contract and thereby hold support means 16 when inserted therein.

In accordance with the present invention various suitable materials may be used for manufacturing the various parts of the educational device herein described. However, in accordance with the preferred embodiments of this invention, the ruler 10, vertical support means 13, elongated support member 14, holding means 15, support means 16, sleeve means 18 and base member 19 are all preferably constructed of plastic.

The educational device of the present invention is designed to allow the student to place a spherical object 12, such as a glass marble, steel ball, etc., on the inclined ruler 10 at a designated point and to observe how, by varying the initial position of the spherical object on the ruler, the impact point of the falling body will either increase or decrease. This is accomplished by positioning the educational device on a support surface 20 like that shown in FIG. 1 and allowing the spherical object 12 to roll down the inclined ruler 10 and then fall freely until it strikes the floor. The farther up the ramp the spherical objects are released, the faster they will be rolling when they leave the ramp, and the greater will be the distance they travel before striking the floor. The students compare the distances traveled and infer that greater distance implies a greater speed. In this experiment, the time of flight is inferred to be constant. The educational device can also be used, for example, in conjunction with an illustration of Newton's Law. This is accomplished by positioning a second spherical object 17, such as a glass marble, steel ball, etc., upon the support means 16 as shown in FIGS. 1 and 2, and by placing a spherical object 12 on the ruler 10, allowing the spherical object 12 to roll down the inclined surface and collide with spherical object 17, thereby illustrating the principle of action and reaction. The results of the collision can be observed by measuring the distance traveled by spherical object 12. Head-on or off-angle collisions can be arranged by moving the sleeve means 18 sideways along holding means 15 in channel 72.

The educational device of the present invention is also designed to permit considerable freedom for the students to identify and change various variables that might influence the spherical objects as they roll down the inclined ruler and either fall directly to the floor or collide with other spherical objects, such as, for example, the following:

1. The starting position of the rolling spherical object 12 on the ruler 10 can be changed from approximately 15 centimeters to 30 centimeters;
2. The angle of incline of the ruler 10 can be changed by changing the position of vertical support means 13 along elongated support member 14;
3. The point at which the rolling spherical object 12 begins falling can be changed by sliding the ruler 10 forward or backward in arm-like members 56;
4. The angle of the collision can be changed by moving the support means 16 to the right or left and up or down;
5. The mass of spherical objects 12 and 17 can be made the same or different by using the same or different types of spherical objects, e.g., glass, metal, wood, etc.;
6. The height of the educational device can be changed by attaching it to different types of supporting surfaces, e.g., chairs, shelves, different tables, etc.

Various types of experiments which can be performed by students using the educational device of this invention are explained in detail in "Science — A Process Approach/Part G, Collisions" published by the American Association for the Advancement of Science.

It will be seen from the foregoing description that a very simple, durable and relatively inexpensive educational device for demonstrating the physical properties of falling objects and collisions has been devised. The educational device described herein has the additional advantages of being rugged, easily assembled, relatively portable and demonstrates the ability to perform experiments which can be substantially duplicated.

While we have illustrated and described a particular embodiment of our invention, it will be understood that various modifications may be made therein without departing from the spirit of the invention and the scope of the appended claims.

We claim:
1. An educational device comprising a flexible ruler including channel means extending along one surface thereof for guiding movement of a substantially spherical object in said channel means, an elongated support member, a vertical support means releasably secured to said support member for supporting said ruler at one end portion thereof in an elevated position, a holding means for holding said ruler at the opposite end portion thereof at a lower elevation, a support means for supporting a substantially spherical object, and a sleeve means for containing said support means in slidable relationship thereto.

2. An educational device according to claim 1 wherein said spherical object is a metal ball, wood ball or glass marble.

3. An educational device according to claim 1 wherein said support member includes a plurality of slots for insertion of said vertical support means whereby the angle of elevation of said ruler is changed by changing the position of said vertical support means in said slots.

4. An educational device according to claim 1 wherein said holding means includes two arm-like members adapted to hold said ruler in slidable relationship to said holding means.

5. An educational device according to claim 1 further including a base member.

6. An educational device according to claim 5 wherein said elongated support member and said holding means include means for releasably engaging said elongated support member and said holding means to said base member.

7. An educational device according to claim 1 wherein said holding means includes a channel member for containing said sleeve means in slidable relationship thereto.

* * * * *